United States Patent [19]

Hahn

[11] Patent Number: 5,847,541

[45] Date of Patent: *Dec. 8, 1998

[54] UNIVERSALLY INTERCHANGEABLE AND MODULAR POWER SUPPLY WITH INTEGRATED BATTERY CHARGER

[75] Inventor: Stan S. Hahn, Moraga, Calif.

[73] Assignee: Advanced Mobile Solutions, Inc., Moraga, Calif.

[*] Notice: The term of this patent shall not extend beyond the expiration date of Pat. No. 5,648,712.

[21] Appl. No.: 892,139

[22] Filed: Jul. 14, 1997

Related U.S. Application Data

[63] Continuation-in-part of Ser. No. 521,113, Aug. 29, 1995, Pat. No. 5,648,712.

[51] Int. Cl.$^6$ .................................................... H01M 10/46
[52] U.S. Cl. ............................................ 320/111; 320/113
[58] Field of Search ................................... 320/111, 112, 320/113, 114, 115, 135, 101, 120; D13/107, 108

[56] References Cited

U.S. PATENT DOCUMENTS

| | | | |
|---|---|---|---|
| 4,684,870 | 8/1987 | George et al. | 320/113 X |
| 5,587,645 | 12/1996 | Sciammarella et al. | 320/111 X |
| 5,629,602 | 5/1997 | Makino | 320/112 X |
| 5,648,712 | 7/1997 | Hahn | 320/111 |

*Primary Examiner*—Edward H. Tso
*Attorney, Agent, or Firm*—Nathan P. Koenig; Crosby, Heafey, Roach & May

[57] ABSTRACT

An integrated power supply and battery charger with interchangeable and collapsible plug capacity capable of simultaneously powering an electrical device while charging a rechargeable battery. Preferably, the power supply further comprises apparatus for facilitating use of the electrical device. In embodiments configured for use with a portable telephone, speaker phone apparatus or a separate headset may be provided to allow convenient use of the telephone while it is being powered by the invention.

10 Claims, 6 Drawing Sheets

UNIVERSALLY INTERCHANGEABLE AND MODULAR POWER SUPPLY WITH INTEGRATED BATTERY CHARGER

RELATED APPLICATIONS

This application is a continuation-in-part of Ser. No. 08/521,113, filed Aug. 29, 1995 now U.S. Pat. No. 5,648,712.

FIELD OF THE INVENTION

The present invention relates generally to power supplies and battery chargers and more particularly to integrated battery charger power supplies which can be disassembled and collapsed for convenient transportation or storage and are adaptable to the varying electrical and physical characteristics of electrical devices and outlets in various parts of the world.

BACKGROUND OF THE INVENTION

Mobile electrical devices such as cellular phones often employ rechargeable batteries which, due to weight and size constraints, require frequent recharging. While many battery charger designs exist, all available designs fail to meet at least one of the many challenges facing the designer of the fully integrated battery charger and power supply for worldwide mobile use.

A first challenge arises from the multi-level power demands of some electrical devices. For example, available cellular phone and notebook computer batteries require a certain power input to be charged, while the phones or computers themselves require another input level to be powered directly. This problem is accentuated for the user who wishes to utilize a mobile electronic device in a truly mobile environment such as a car or boat, which normally supplies only dc power and often subjects the device to extreme vibration for extended periods of time. While various adaptors and conversion circuits are available which can make most small electrical devices run in a truly mobile environment, such add-on devices can quickly become burdensome for the traveler who wishes to minimize the effect of the vibration in the mobile environment and the baggage associated with achieving true electronic mobility.

A second design challenge arises from the desire of many users to continue using their electrical device while charging a battery which may or may not be connected to the device. This challenge was addressed with some success by Weiss, et al., as disclosed in U.S. Pat. No. 5,059,885, assigned to Motorola, Inc. and incorporated by reference herein in its entirety. Weiss is directed to a battery charger housing including a battery positioning and support apparatus. However, available commercial embodiments of the apparatus disclosed in Weiss require an external power supply to power an internal battery charging circuit, thereby adding to the complexity and burden of using the available apparatus. Moreover, while the apparatus disclosed in Weiss can accommodate batteries of varying sizes, gravity is the only means disclosed in Weiss for maintaining the batteries in a charging position. Thus, the apparatus disclosed in Weiss may prove less than optimal in a truly mobile environment, such as a boat or car, wherein the charger may not remain level throughout an unsupervised charging session. Finally, the user of the Weiss apparatus must detach a charging battery or electrical device attached thereto from the charger housing to use the battery or device.

One available and very popular battery charger and power supply for cellular telephones, marketed by Motorola, Inc., incorporates a dual use stand similar to the stand disclosed by Weiss, wherein a phone and battery can be placed and separately charged and powered. However, this design remains dependent upon an external power supply, requires the user to detach the electronic device to make use of it, and fails to address the security requirements necessary for a design compatible with the truly mobile environment.

Further, even if a power supply and battery charger can supply current to both an electrical device and a rechargeable battery, it should still be convenient to operate the electrical device. For example, when the device is a portable telephone, a user must be able to conveniently dial and use the telephone when it is connected to the power supply.

Another challenge in charger design arises from the fact that while many electrical devices are sold for use throughout the world, there is no world standard for electrical plug configurations, size, shape, position or number of prongs. The wide variety of socket configurations in use worldwide burdens international suppliers of mobile products to varied countries and international travelers who wish to use electrical devices in a portable fashion.

Most industrial nations use a standardized alternating current supply with a hot side and a neutral side. Some plugs specifically incorporate a separate earth or ground lead while others do not. A problem exists, therefore, with physically accessing an AC current source supplied through any number of outlet configurations and interfacing that current source with the appropriate input connections for the power supply and/or battery charger as well as with the device to be powered and/or the battery to be charged.

Existing plugs have an awkward shape with prongs protruding from the end. If, for example, a plug is moved from location to location, the prongs of the plug extend outward and can be difficult to pack or store or can catch on clothing when packed into a travel case.

A few plug devices have been designed with a plug or prongs which fold into a casing. For example, some rechargeable flashlights include the collapsible prongs which can be rotated into a position extending out from the body of the flashlight and plugged directly into a wall socket or extension cord. In another example, some telephone charging stations include a cradle for the telephone and a rotatable plug which can be extended into position for plugging into a wall socket, or collapsed into a space in the shell of the charging station, particularly so that a user may slip a charging station into a pocket, a briefcase, or other container.

Presently available collapsible plug devices suffer from various problems which make them inconvenient or even dangerous to use. In particular, the rotatable plug has only a weak spring holding the plug in position. It does not take much effort to collapse the plug, which may cause the plug to partially or completely pull out of a wall socket. This can compromise the electrical connection to the point that the plug no longer is in electrical contact with source current. In some circumstances, this may expose the prongs of the plug in such a way that a person, might come into contact with live current, thereby causing bodily harm. In addition, a collapsing plug might pinch the user.

Accordingly, for the mobile user there is a need for a charging device which can be flexibly incorporated into a variety of work environments, which can supply charging power from a variety of AC and DC electricity sources in known international configurations, which can charge batteries without monopolizing use of the battery-powered device benefitting from the charge, which enables the user to continue using the device while the device receives power from the charger, and which can directly power the device, all in an easy to use and compact package.

SUMMARY OF THE INVENTION

The integrated power supply and battery charger of the invention comprises an electrical circuit including power supply circuitry, a casing providing a housing for said electrical circuit, plug means for receiving and forwarding electrical current to the electrical circuit, means for detachably connecting said electrical circuit to a first electrical device and to a rechargeable battery simultaneously, and fastening means integral with said casing, for releasably attaching the rechargeable battery to said casing.

The present invention provides a universally interchangeable and modular power supply and integrated battery charger which can be securely utilized in a mobile environment or conveniently used as an everyday, convenient substitute for existing devices. The invention accommodates most internationally known physical and electrical configurations for supply power. In one embodiment, the plug prongs of the inventive device are maintained in an extended position but may be folded easily to a compact, collapsed position for easy travel. This collapsible prong feature is incorporated within an interchangeable plug device which can be designed for use in a variety of configurations and still provide the mechanical advantages of fitting closely to the socket and, generally, against a wall. Moreover, these embodiments provide a safe means for drawing current from an interchangeable plug while minimizing the risk of exposure to a live prong or connector. In other embodiments, a standard plug and cord arrangement may also be suitable to access current for the power supply and the battery charger.

In embodiments comprising a collapsible plug, the electrical plug is detachably mounted in the casing and movable between a detached and an engaged, operative position. In other embodiments, it is preferable to employ a standard plug and cord to supply current to the integrated power supply and battery charger. This is particularly true where the device is configured primarily for desktop use.

In a preferred embodiment, a power supply is provided within the casing so that a rechargeable device can be attached to the battery charger and plugged directly into an ac or dc electrical power source.

In embodiments configured for powering a portable telephone, the invention preferably further comprises auxiliary apparatus for interfacing with the electronic device. For example, the integrated power supply and battery charger further comprises a microphone and amplified speaker that are connected to the portable telephone when the telephone is drawing power so that the entire assembly may be used as a speaker phone. Alternatively, the integrated power supply and battery charger may further comprise a headset, comprising a microphone and speaker which may be used with the telephone while it is being powered by the invention. The headset may either be conventionally wired to the power supply/battery charger or may employ a wireless connection.

In yet other embodiments, the means for connecting the electrical device to the integrated power supply and battery charger may comprise an elongated cord to allow a user enough flexibility to conveniently use the device while it is being powered by the invention.

Accordingly, it is an object of this invention to provide an integrated battery charger and power supply including an interchangeable plug device and the ability to simultaneously accomodate a battery for charging and powering an electrical device.

Another object of this invention is to provide a plurality of interchangeable plug and cord devices designed to connect to or integrate with a compatible carrier which can be mechanically and electrically connected to an electrical device.

DETAILED DESCRIPTION OF THE PREFERRED EMBODIMENTS

The inventive and highly modular device of the present invention includes a casing, an electrical plug either mounted to the casing or connected by a cord, a cradle for mounting a battery on the casing, and a plurality of electrical contacts and receptacles for electrical communication between modular electrical inputs and outputs designed for a variety of electrical sources and destinations. The specific shape of the casing can be modified in many ways to accommodate specific design needs. The plug can also be modified to accommodate specific design needs, including the number and configuration of electrical prongs to adapt to a variety of standard, electrical outlets. Additional details regarding the design of the plug and the casing may be found in co-pending application, Ser. No. 08/521,113, filed Aug. 29, 1995, which is hereby incorporated in its entirety by reference. The drawings illustrate a representative device but one skilled in the art will recognize that a variety of devices can be designed and manufactured, which are encompassed by the teachings of this invention.

Figure 1:
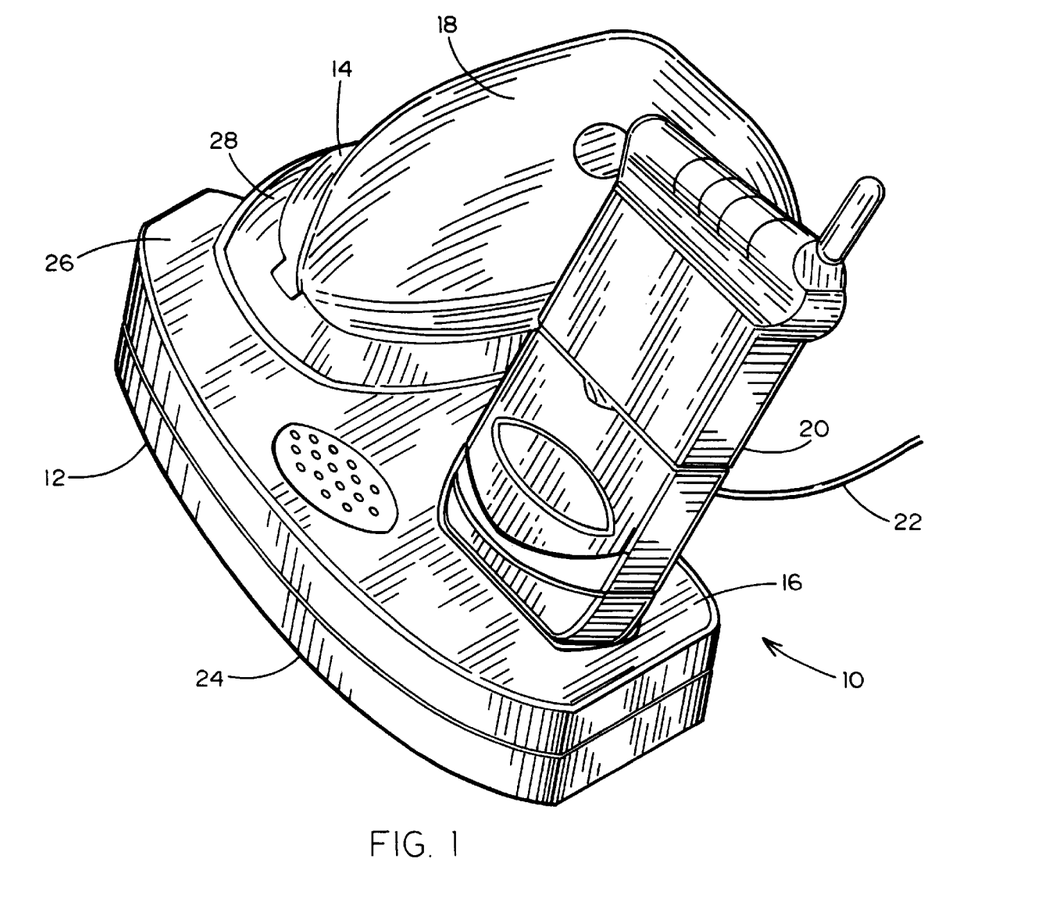
FIG. 1 is a perspective view of an integrated power supply and battery charger of the present invention having a speaker phone, showing a portable telephone and a rechargeable battery connected to the invention.

Referring to FIG. 1 an integrated power supply and battery charger 10 comprising a casing 12 having cradles 14 and 16 for receiving a rechargeable battery 18 and an electronic device 20, a portable telephone. Casing 12 contains an electrical circuit, preferably a switching power supply on a printed circuit board, connected to power cord 22 and which can simultaneously supply power to portable telephone 20 and charge rechargeable battery 18. Casing 12 also comprises a speaker and microphone 24, allowing convenient use of portable telephone 20 while connected to the casing. Retention clip 26 engages a complimentary depression 28 on battery 18 to secure the battery to casing 12. In a preferred embodiment, casing 12 is preferably made of high impact thermoplastic material, with top and bottom halves which can be sealed together by any convenient means.

Figure 2:
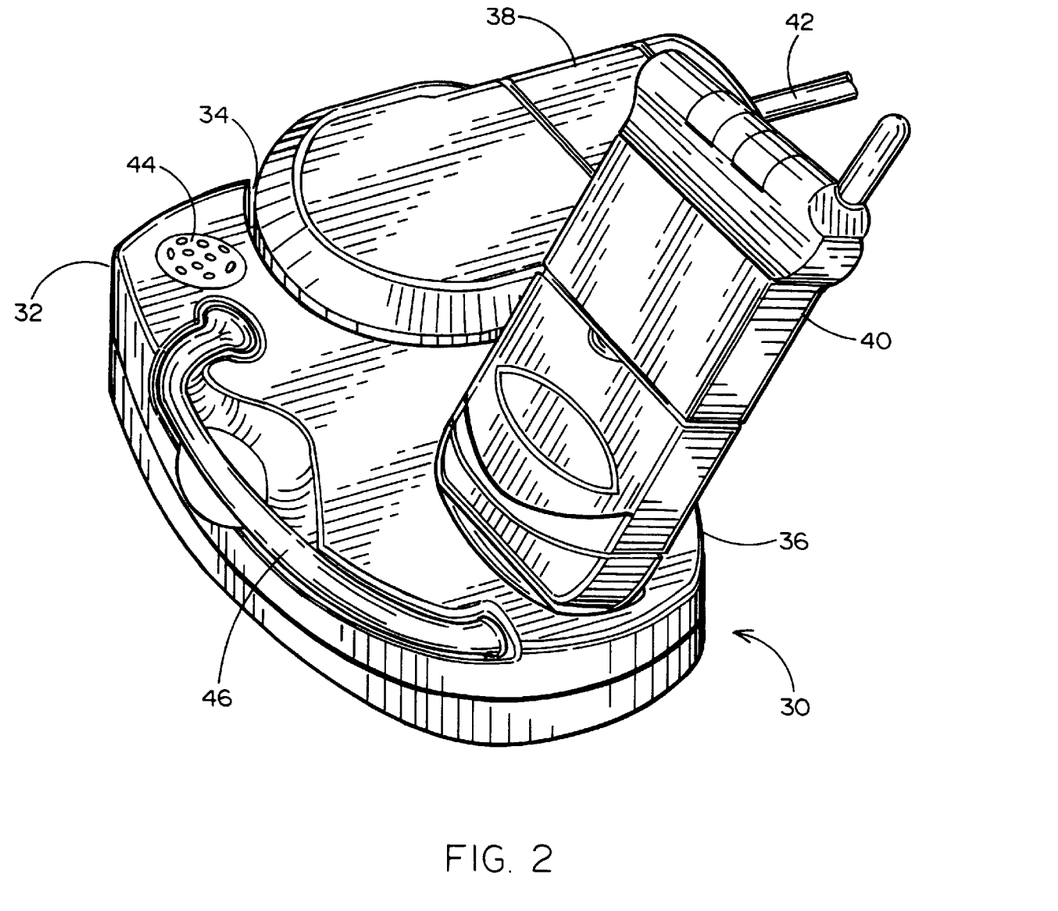
FIG. 2 illustrates a perspective view of an inventive charger and power supply unit which further comprises a head set, showing a portable telephone and a rechargeable battery connected to the invention.

FIG. 2 illustrates an alternate embodiment similar to that shown in FIG. 1. An integrated power supply and battery charger 30 also comprising a casing 32 having cradles 34 and 36 for receiving a rechargeable battery 38 and an electronic device, such as portable telephone 40, an electrical circuit connected to power cord 42 can simultaneously supply power to portable telephone 40, and charge rechargeable battery 38. Although casing 32 comprises speaker phone apparatus 44, it further comprises a wireless headset 46 for using portable telephone 40 while retained in casing 32. Wireless headset 46 may employ a conventional RF transceiver, or other suitable technology. Alternately, a wired headset may also be employed.

Figure 3:
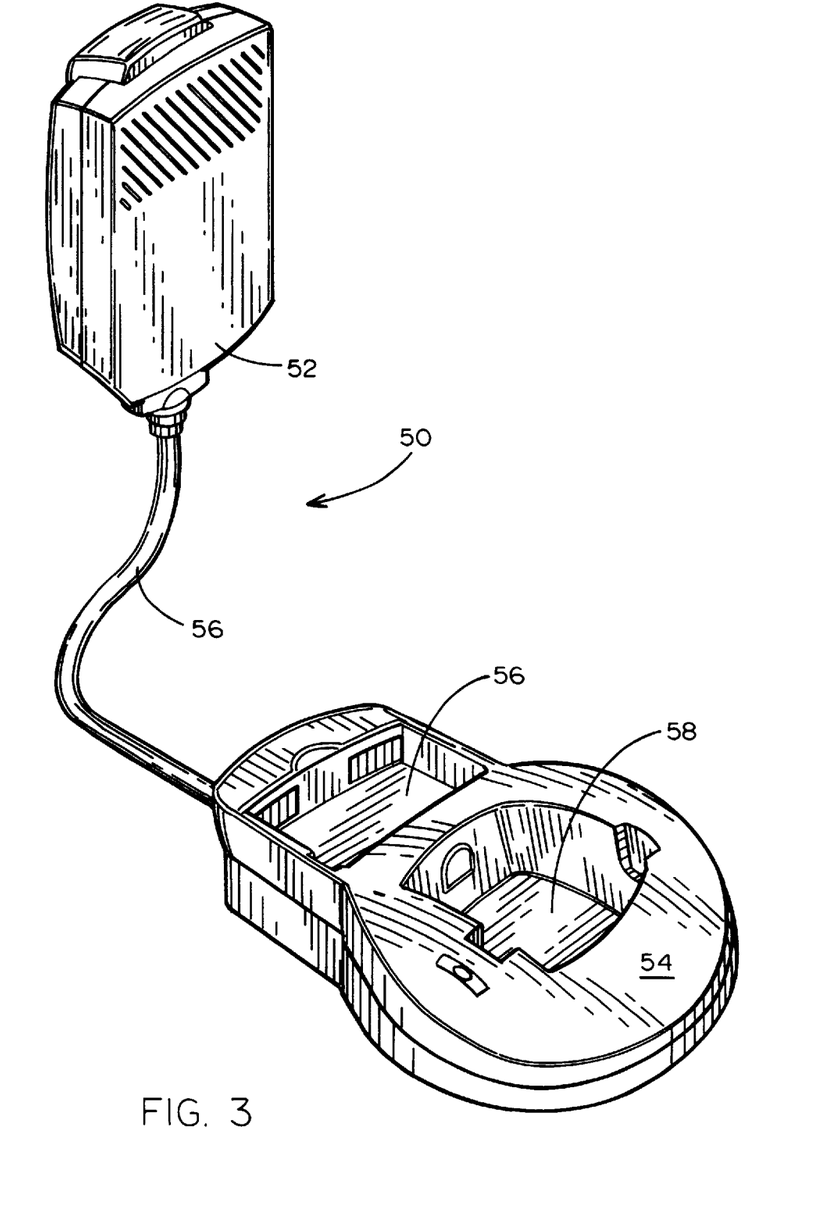
FIG. 3 shows an inventive power supply and charger comprising a casing with a collapsible plug and a desktop unit with receptacles for a battery and an electronic device.
Figure 4:
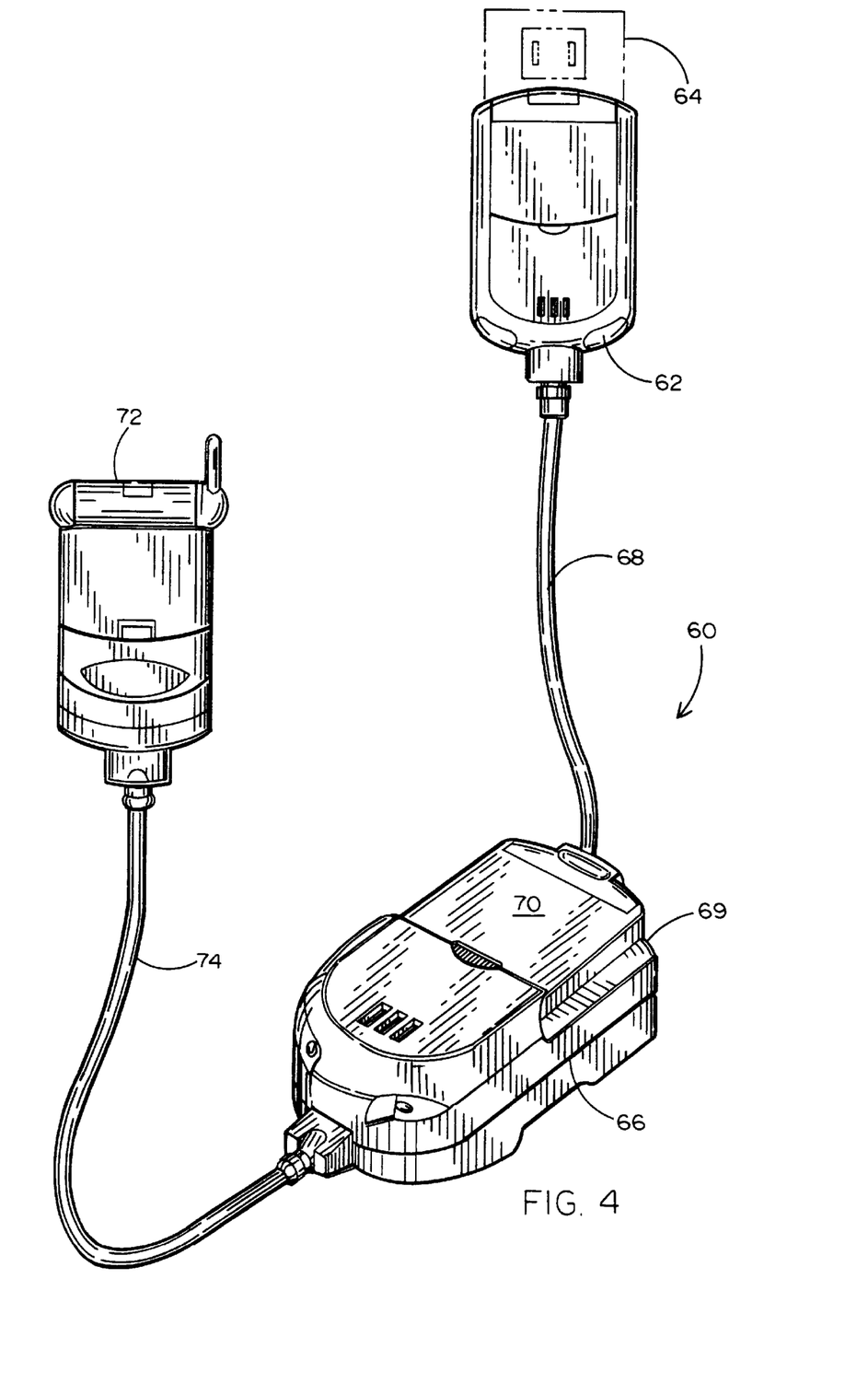
FIG. 4 illustrates an embodiment similar to FIG. 3, except the electronic device is connected to the desktop unit by a cord.

In embodiments such as shown in FIGS. 1 and 2, a standard cord and plug arrangement is suitable for delivering current to the inventive charger and power supply, particularly where it is configured to be used as a desktop accessory and will not be transported constantly. In alternate embodiments, such as shown in FIGS. 3 and 4, the electric circuit for converting ac line voltage to current suitable for powering the electric device and charging the battery may be separated from the battery and device cradles. In FIG. 3, the integrated power supply and battery charger 50 comprises a casing 52, preferably having a collapsible plug for engaging a wall socket, containing an electric circuit connected to the plug which delivers current to charger stand 54 via cord 56. Charger stand 54 has cradles 56 and 58 for receiving a rechargeable battery and an electronic device. In FIG. 4, integrated power supply and battery charger 60 comprises a casing 62, also preferably having a collapsible plug for engaging a wall socket 64, containing an electric circuit connected to the plug which delivers current to charger stand 66 via cord 68. Charger stand 66 has a single cradle 69 for receiving a rechargeable battery 70 and supplies current for electronic device 72 via cord 74.

Figure 5:
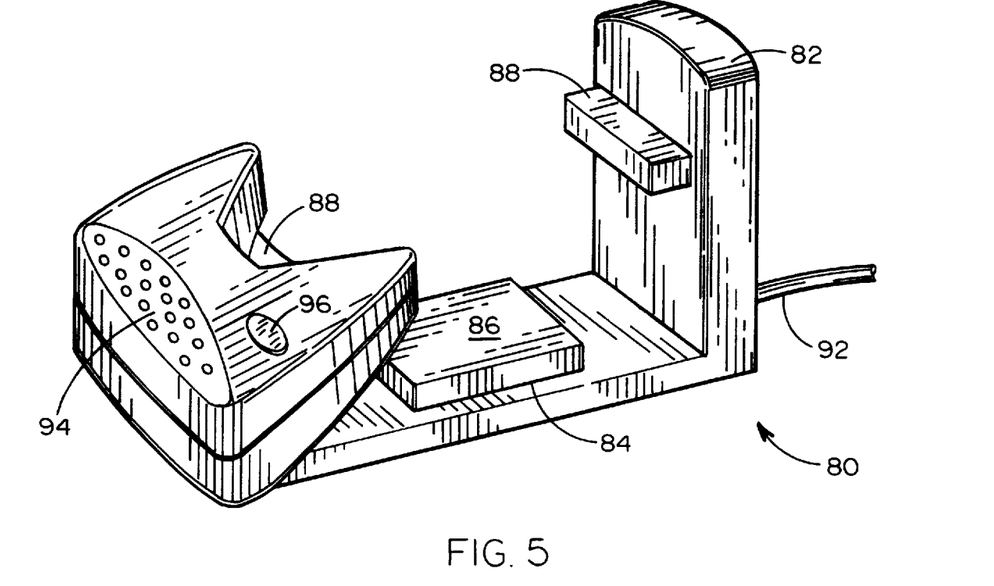
FIGS. 5 and 6 show an alternate embodiment of the invention comprising a speaker phone and a cradle for receiving a portable telephone.
Figure 6:
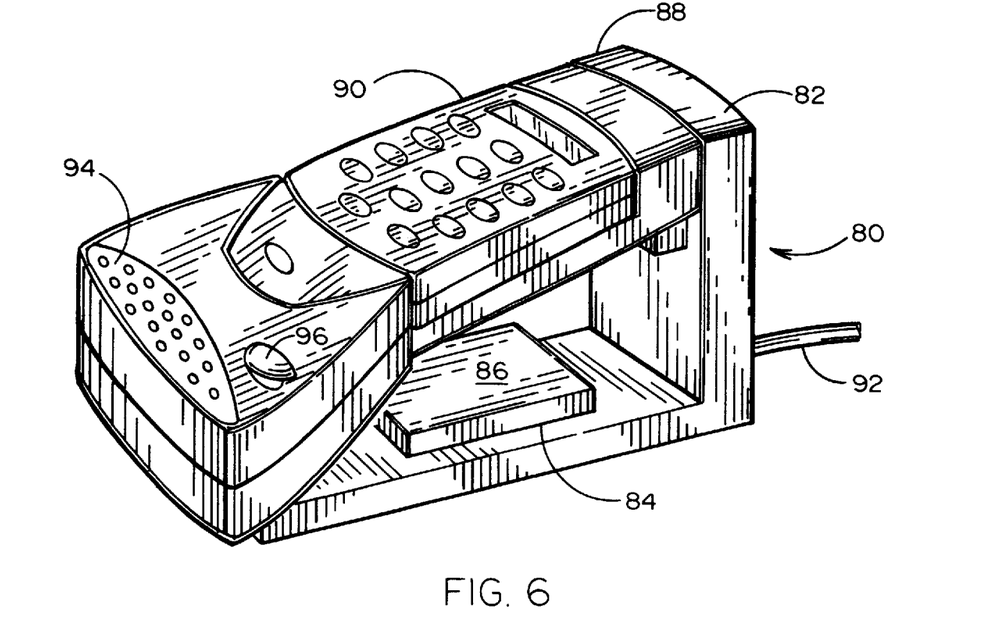

FIGS. 5 and 6 illustrate yet another embodiment configured for desktop use. Integrated power supply and battery charger 80 comprising a casing 82 has a cradle 84 for receiving a rechargeable battery 86 and an elevated cradle 88 for supporting portable telephone 90 in an easily accessible position. Casing 82 contains an electrical circuit connected to power cord 92 that simultaneously can supply power to portable telephone 90, and charge rechargeable battery 86. Casing 82 also comprises a speaker 94 and microphone 96, to allow portable telephone 90 to be used as a speaker phone.

Figure 7:
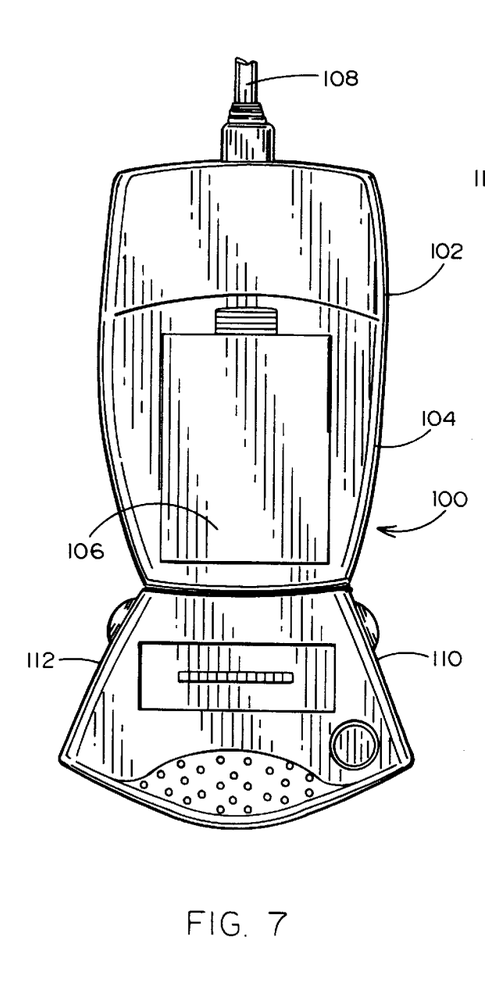
FIGS. 7–9 show yet another embodiment of the inventive charge and power supply comprising a detachable module for connecting a portable telephone and providing speaker phone capability.
Figure 8:
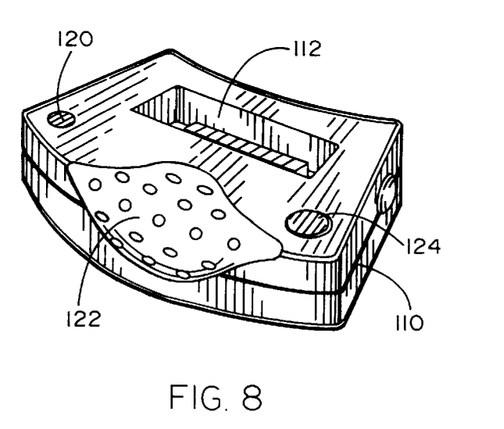
Figure 9:
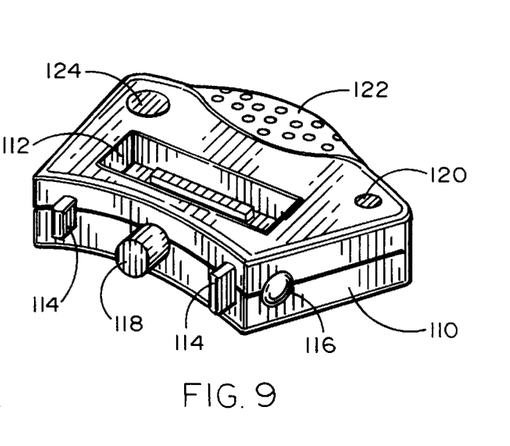

In devices configured for greater mobile use, it may be desirable to provide a modular approach so that only the battery charger may be transported to save weight and bulk. For example, in FIGS. 7–9, integrated power supply and battery charger 100 comprises a casing 102 which has a cradle 104 for receiving a rechargeable battery 106. Casing 102 contains an electrical circuit connected to power cord 108. Modular adapter 110 comprises a cradle 112 for receiving a portable telephone and has connectors 114 actuated by button 116 to releasably secure adapter 110 to casing 102. The necessary electrical connections between modular adapter 110 and casing 102 may be made by the shown DIN connector 118, or any other suitable means. Adapter 110 also comprises speaker phone apparatus, microphone 120 and speaker 122, and preferably may also comprise functions for facilitating use of the portable telephone such as send button 124.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. An apparatus for both charging a battery and supplying power to an electrical device, said apparatus comprising:
   an electrical circuit including power supply circuitry,
   a casing providing a housing for said electrical circuit,
   first current supplying means for detachably connecting said electrical circuit to a first electrical device,
   second current supplying means for detachably connecting said electrical circuit to a rechargeable battery,
   fastening means integral with said casing, for releasably attaching the rechargeable battery to said casing and placing the rechargeable battery in electrical communication with said second current supplying means and said electrical circuit, and
   means for facilitating use of said first electrical device while connected to said electrical circuit,
   wherein said first electrical device and said rechargeable battery may be simultaneously connected to said electrical circuit.

2. The apparatus of claim 1, wherein said electrical circuit selectively supplies electrical current to said first electrical device and said rechargeable battery.

3. The apparatus of claim 1, wherein said first electrical device comprises a portable telephone.

4. The apparatus of claim 3, wherein the means for facilitating use comprises speaker phone apparatus.

5. The apparatus of claim 3, wherein the means for facilitating use comprises a headset.

6. The apparatus of claim 3, wherein the means for facilitating use comprises a wireless headset.

7. The apparatus of claim 1, wherein the means for facilitating use comprises an electrical cord for connecting said first electrical device to said electrical circuit.

8. The apparatus of claim 1, further comprising plug means for receiving and forwarding electrical current, including input and output ends, said input end connectable to a source of electrical current, said plug means capable of accommodating a plurality of distinct electrical current source physical configurations at said input end.

9. The apparatus of claim 8, wherein said input end comprises a collapsible electrical prong.

10. The apparatus of claim 4, wherein said speaker phone apparatus and said first current supplying means are releasably connected to said casing.

* * * * *

UNITED STATES PATENT AND TRADEMARK OFFICE
CERTIFICATE OF CORRECTION

PATENT NO.   : 5,847,541
DATED        : December 8, 1998
INVENTOR(S)  : Hahn

It is certified that error appears in the above-identified patent and that said Letters Patent is hereby corrected as shown below:

In column 2, line 58, delete "person," and insert therefor --person--.

In column 2, line 65, delete "configurations," and insert therefor --configurations;--.

In column 2, line 67, delete "charge," and insert therefor --charge;--.

In column 3, line 2, delete "charger," and insert therefor --charger;--.

In column 4, line 47, delete "standard," and insert therefor --standard--.

In column 4, line 50, after "29, 1995," insert --and issued July 15, 1997, as U.S. Pat. No. 5,648,712,--.

In column 4, line 55, delete "1" and insert therefor --1,--.

In column 5, line 6, delete "comprising" and insert therefor --comprised--.

In column 5, line 9, delete "42" and insert therefor --42,--.

In column 5, line 17, delete "as shown" and insert therefor --as those shown--.

In column 5, line 42, delete "80 comprising a casing 82" and insert therefor --80, comprising a casing 82,--.

UNITED STATES PATENT AND TRADEMARK OFFICE
CERTIFICATE OF CORRECTION

PATENT NO. : 5,847,541
DATED : December 8, 1998
INVENTOR(S) : Hahn

It is certified that error appears in the above-identified patent and that said Letters Patent is hereby corrected as shown below:

In column 5, line 47, delete "90," and insert therefor --90--.

In column 6, line 3, delete "and preferably" and insert therefor --and, preferably,--.

Signed and Sealed this

Twenty-fifth Day of May, 1999

Attest:

Q. TODD DICKINSON

Attesting Officer

Acting Commissioner of Patents and Trademarks